(12) United States Patent
van Rooyen et al.

(10) Patent No.: US 8,396,508 B2
(45) Date of Patent: *Mar. 12, 2013

(54) METHOD AND SYSTEM FOR A MOBILE RECEIVER ARCHITECTURE FOR EUROPEAN BAND CELLULAR AND BROADCASTING

(75) Inventors: Pieter Gert Wessel van Rooyen, San Diego, CA (US); Kwan Young Shin, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1731 days.

This patent is subject to a terminal disclaimer.

(21) Appl. No.: 11/010,983

(22) Filed: Dec. 13, 2004

(65) Prior Publication Data

US 2006/0128332 A1  Jun. 15, 2006

(51) Int. Cl.
*H04M 1/00* (2006.01)

(52) U.S. Cl. ......... 455/553.1; 343/746; 455/19; 455/83; 455/562.1; 455/575.7

(58) Field of Classification Search ........ 455/3.01–3.02, 455/3.06, 434, 450–452.1, 77–78, 550.1, 455/552.1, 553.1, 188.1, 188, 180.1, 180, 455/168.1, 296, 13.3, 19, 82, 83, 562.1, 575.7; 725/100, 118, 62; 343/702, 745, 746

See application file for complete search history.

(56) References Cited

U.S. PATENT DOCUMENTS

| 6,801,777 | B2* | 10/2004 | Rusch | 455/452.2 |
|---|---|---|---|---|
| 6,819,941 | B2* | 11/2004 | Dening et al. | 455/552.1 |
| 6,862,441 | B2* | 3/2005 | Ella | 455/296 |
| 6,944,427 | B2* | 9/2005 | Haub et al. | 455/296 |
| 7,103,374 | B2* | 9/2006 | Yla-Jaaski et al. | 455/502 |
| 2002/0021809 | A1 | 2/2002 | Salo et al. | |
| 2002/0059614 | A1* | 5/2002 | Lipsanen et al. | 725/75 |

(Continued)

FOREIGN PATENT DOCUMENTS

| CN | 1260094 | 7/2000 |
|---|---|---|
| GB | 2313981 A | 12/1997 |

(Continued)

OTHER PUBLICATIONS

Siemens Mobile, *Brodcasting @ Siemens Mobile*, ICM MP, Martin Gebler, Broadcast Media in Mobile, London, Apr. 20, 2004, ICM MP SM BD, IPDC, pp. 1-13.

(Continued)

*Primary Examiner* — Vladimir Magloire

(74) *Attorney, Agent, or Firm* — Sterne, Kessler, Goldstein & Fox PLLC

(57) ABSTRACT

In a video processing system, a method and system for a mobile receiver architecture for European (EU) Band cellular and broadcasting are provided. Receive channels may be processed in at least one radio frequency front end (RFFE) in a mobile terminal and may comprise at least one of a VHF/UHF broadcast channel and EU band cellular channels capable of carrying voice and data. The cellular channels may be WCDMA 2100 MHz, GSM 1800 or 900 MHz. A single cellular/broadcast radio frequency integrated circuit (RFIC) may be utilized for processing the receive channels. In another embodiment, a cellular band RFIC may process the EU band cellular channels and a broadcast RFIC may process the broadcast channel. Moreover, a first RFIC may process the WCDMA channel, a second RFIC may process the GSM channels, and a broadcast RFIC may process the broadcast channel.

26 Claims, 13 Drawing Sheets

U.S. PATENT DOCUMENTS

| | | | |
|---|---|---|---|
| 2002/0082044 A1* | 6/2002 | Davenport | 455/552 |
| 2002/0097085 A1* | 7/2002 | Stapleton | 330/10 |
| 2002/0183025 A1* | 12/2002 | Seaberg et al. | 455/3.01 |
| 2003/0109277 A1* | 6/2003 | Fulghum et al. | 455/552 |
| 2004/0005870 A1* | 1/2004 | Yla-Jaaski et al. | 455/265 |
| 2005/0208918 A1* | 9/2005 | Rowe et al. | 455/296 |
| 2005/0227631 A1* | 10/2005 | Robinett | 455/83 |
| 2005/0233765 A1* | 10/2005 | Sanders et al. | 455/552.1 |
| 2005/0245202 A1* | 11/2005 | Ranta et al. | 455/78 |
| 2006/0009177 A1* | 1/2006 | Persico et al. | 455/143 |
| 2006/0099993 A1* | 5/2006 | Leinonen et al. | 455/562.1 |
| 2006/0128302 A1* | 6/2006 | van Rooyen et al. | 455/3.06 |
| 2006/0128304 A1 | 6/2006 | Ramaswamy | |
| 2006/0128393 A1* | 6/2006 | Rooyen | 455/452.2 |
| 2006/0128427 A1* | 6/2006 | van Rooyen | 455/553.1 |
| 2006/0130101 A1* | 6/2006 | Wessel van Rooyen | 725/100 |

FOREIGN PATENT DOCUMENTS

| | | |
|---|---|---|
| WO | WO-03/045064 A | 5/2003 |
| WO | WO 2004/080011 | 9/2004 |

OTHER PUBLICATIONS

DVB© Digital Video Broadcasting, *Transmission System for Handheld Terminals (DVB H)*, DVB Document A081, Jun. 2004, pp. 1-11.

DVB© Digital Video Broadcasting, *The Convergence of Broadcast & Telecommunications Platforms*, TM2486 Rev 4, UMTS23Rev1, written by ad hoc Group DVB-UMTS, Editor: Reiner Lueder, Report No. 1 (full), Jun. 2, 2002, pp. 1-73.

\* cited by examiner

METHOD AND SYSTEM FOR A MOBILE RECEIVER ARCHITECTURE FOR EUROPEAN BAND CELLULAR AND BROADCASTING

CROSS-REFERENCE TO RELATED APPLICATIONS/INCORPORATION BY REFERENCE

This application makes reference to:
U.S. application Ser. No. 11/010,991, filed Dec. 13, 2004;
U.S. application Ser. No. 11/010,847, filed Dec. 13, 2004;
U.S. application Ser. No. 11/010,461, filed Dec. 13, 2004;
U.S. application Ser. No. 11/010,877, filed Dec. 13, 2004;
U.S. application Ser. No. 11/010,914, filed Dec. 13, 2004;
U.S. application Ser. No. 11/010,486, filed Dec. 13, 2004;
U.S. application Ser. No. 11/010,903, filed Dec. 13, 2004;
U.S. application Ser. No. 11/011,009, filed Dec. 13, 2004;
U.S. application Ser. No. 11/010,855, filed Dec. 13, 2004;
U.S. application Ser. No. 11/010,743, filed Dec. 13, 2004;
U.S. application Ser. No. 11/011,000, filed Dec. 13, 2004;
U.S. application Ser. No. 11/010,681, filed Dec. 13, 2004;
U.S. application Ser. No. 11/010,883, filed Dec. 13, 2004;
U.S. application Ser. No. 11/011,006, filed Dec. 13, 2004;
U.S. application Ser. No. 11/010,487, filed Dec. 13, 2004;
U.S. application Ser. No. 11/010,481, filed Dec. 13, 2004; and
U.S. application Ser. No. 11/010,524, filed Dec. 13, 2004.

All of the above stated applications are hereby incorporated herein by reference in their entirety.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to communication of information via a plurality of different networks. More specifically, certain embodiments of the invention relate to a method and system for a mobile receiver architecture for European (EU) band cellular and broadcasting.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology which may introduce fully packet-switched networks, which support high-speed data communications.

The general packet radio service (GPRS), which is an example of a 2.5G network service oriented for data communications, comprises enhancements to GSM which required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates which may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (W-CDMA) to support data transfer rates, which may be as high as 2 Mbits/s. One reason why W-CDMA may support higher data rates is that W-CDMA channels may have a bandwidth of 5 MHz versus the 200 kHz channel bandwidth in GSM. A related 3G technology, high speed downlink packet access (HSDPA), is an Internet protocol (IP) based service oriented for data communications, which adapts W-CDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers are to be used in the COFDM scheme. The "2K" mode permits 1,705 carrier frequencies which may carry symbols, each with a useful duration of 224 µs for an 8 MHz channel. In the "8K" mode there are 6,817 carrier frequencies, each with a useful symbol duration of 896 µs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates which may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

Time slicing may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, time, which may be used to temporarily power down the receiver at the user equipment. Time slicing may also facilitate service handovers as user equipment moves from one cell to another because the delay time imposed by time slicing may be used to monitor transmitters in neighboring cells. The MPE-FEC may comprise Reed-Solomon coding of IP data packets, or packets using other data protocols. The 4K mode in DVB-H may utilize 3,409 carriers, each with a useful duration of 448 µs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits which are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

Supporting broadcasting and European (EU) band cellular technologies, for example, may prove a difficult task in the design and implementation of radio frequency front ends (RFFE) for mobile terminals because of the range of frequencies and/or data rates that need to be supported. In this regard, complex architectures may result in the receiver and transmitter portion of a mobile terminal in order to support broadcasting and EU band cellular technologies.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for a mobile receiver architecture for European (EU) band cellular and broadcasting. Aspects of the method may comprise processing in at least one radio frequency front end (RFFE), in a mobile terminal, at least one of a plurality of receive channels. The receive channels may comprise at least one of a VHF/UHF broadcast channel and at least one of an EU band cellular channel capable of carrying voice and data. An EU band cellular channel comprising a WCDMA channel in the 2100 MHz range may be received in an RFFE. An EU band cellular channel comprising a GSM channel in the 1800 or 900 MHz range may be received in an RFFE. WCDMA signals in the 2100 MHz range may be transmitted utilizing an RFFE. GSM signals in the 1800 or 900 MHz range may be transmitted utilizing an RFFE.

In another aspect of the method, WCDMA 2100 MHz, GSM 1800 and 900 MHz EU band cellular channels and VHF/UHF broadcasting channels may be received. A single cellular/broadcast radio frequency integrated circuit (RFIC) in the mobile terminal may handle the receive EU band cellular channels and the receive VHF/UHF broadcasting channels. In this regard, the EU band cellular channels may be transmitted using the single cellular/broadcast RFIC. In another implementation, a cellular band RFIC in the mobile terminal may handle the receive EU band cellular channels and a second RFIC in the mobile terminal may handle the receive VHF/UHF broadcasting channels. In this regard, the EU band cellular channels may be transmitted using the cellular band RFIC.

In another aspect of the method, a first RFIC in the mobile terminal may handle the receive WCDMA 2100 MHz EU band cellular channel, a second RFIC in the mobile terminal may handle the receive GSM 1800 and 900 MHz EU band cellular channels, and a third RFIC in the mobile terminal may handle the receive VHF/UHF broadcasting channels. In this regard, WCDMA 2100 MHz EU band cellular channels may be transmitted using the first RFIC and GSM 1800 and 900 MHz EU band cellular channels may be transmitted using the second RFIC.

Aspects of the system may comprise at least one RFFE, in a mobile terminal, that process at least one of a plurality of receive channels. The receive channels may comprise at least one of a VHF/UHF broadcast channel and at least one of an EU band cellular channel capable of carrying voice and data. An RFFE may receive an EU band cellular channel comprising a WCDMA channel in the 2100 MHz range. An RFFE may receive an EU band cellular channel comprising a GSM channel in the 1800 or 900 MHz range. An RFFE may be utilized to transmit WCDMA signals in the 2100 MHz range. An RFFE may be utilized to transmit GSM signals in the 1800 or 900 MHz range.

In another aspect of the system, the mobile terminal may receive WCDMA 2100 MHz, GSM 1800 and 900 MHz EU band cellular channels and VHF/UHF broadcasting channels. The mobile terminal may comprise a single cellular/broadcast radio frequency integrated circuit (RFIC) that may be adapted to handle the receive EU band cellular channels and the receive VHF/UHF broadcasting channels. In this regard, the mobile terminal may also be adapted to transmit the EU band cellular channels using the single cellular/broadcast RFIC. In another implementation, the mobile terminal may comprise a cellular band RFIC that may be adapted to handle the receive EU band cellular channels and a second RFIC that may be adapted to handle the receive VHF/UHF broadcasting channels. In this regard, the mobile terminal may also be adapted to transmit the EU band cellular channels using the cellular band RFIC.

In another aspect of the system, the mobile terminal may comprise a first RFIC that may be adapted to handle the receive WCDMA 2100 MHz EU band cellular channel, a second RFIC that may be adapted to handle the receive GSM 1800 and 900 MHz EU band cellular channels, and a third RFIC that may be adapted to handle the receive VHF/UHF broadcasting channels. In this regard, the mobile terminal may also be adapted to transmit WCDMA 2100 MHz EU band cellular channels using the first RFIC and GSM 1800 and 900 MHz EU band cellular channels using the second RFIC.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a mobile receiver architecture for European (EU) Band cellular and broadcasting. Receive channels may be processed in at least one radio frequency front end (RFFE) in a mobile terminal and may comprise at least one of a VHF/UHF broadcast channel and EU band cellular channels capable of carrying voice and data. The cellular channels may be WCDMA 2100 MHz, GSM 1800 or 900 MHz channels. A single cellular/broadcast radio frequency integrated circuit (RFIC) may be utilized for processing the receive channels. In another embodiment, a cellular band RFIC may process the EU band cellular channels and a broadcast RFIC may process the broadcast channel. Moreover, a first RFIC may process the WCDMA channel, a second RFIC may process the GSM channels, and a broadcast RFIC may process the broadcast channel.

One basic function of an RFIC may comprise processing RF and baseband signals at a mobile terminal. Tasks performed by an RFIC may comprise, but are not limited to, modulation and/or demodulation, low pass filtering, and digital to analog (D/A) and/or analog to digital (A/D) conversion. When receiving an RF signal, the RFIC may demodulate the RF signal to the baseband frequency. Subsequently, the baseband frequency signal may undergo low pass filtering to eliminate sideband artifacts from the demodulation process. The RFIC may perform an A/D conversion before transmitting a digital baseband signal. When receiving a baseband signal, the RFIC may perform a D/A conversion, subsequently modulating the signal to an RF frequency. The D/A operation may also be performed in a baseband processor, for example.

Figure 1A:
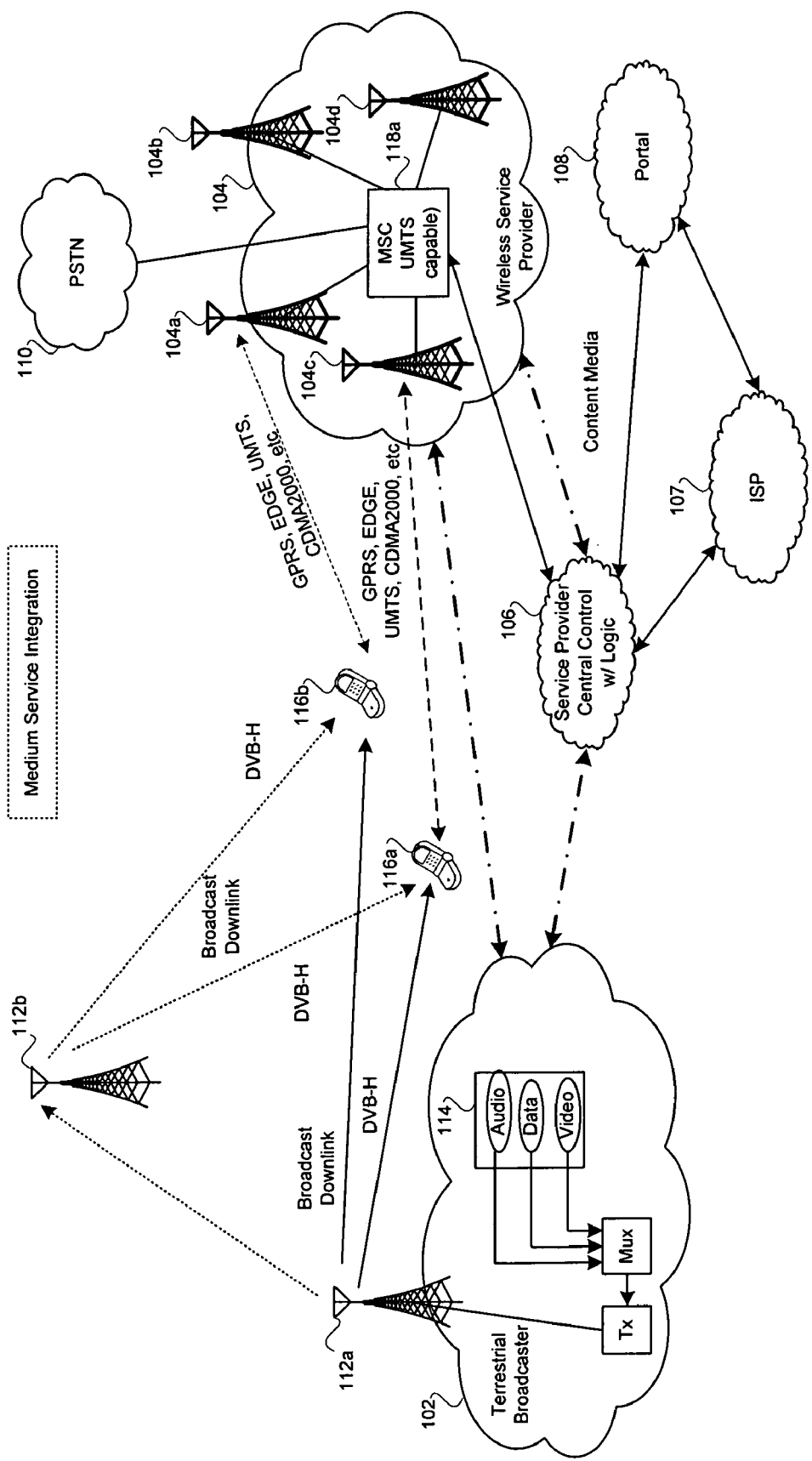
FIG. 1*a* is a block diagram of an exemplary system for providing integrated services between a cellular network and a digital video broadcast network, in accordance with an embodiment of the invention.

FIG. 1a is a block diagram of an exemplary system for providing integrated services between a cellular network and a digital video broadcast network, in accordance with an embodiment of the invention. Referring to FIG. 1a, there is shown terrestrial broadcaster network 102, wireless service provider network 104, service provider 106, an Internet service provider (ISP) 107, a portal 108, public switched telephone network 110, and mobile terminals (MTs) 116a and 116b. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise VHF/UHF broadcast antennas 112a and 112b. The wireless service provider network 104 may comprise mobile switching center (MSC) 118a, and a plurality of cellular base stations 104a, 104b, 104c, and 104d.

The terrestrial broadcaster network 102 may comprise suitable equipment that may be adapted to encode and/or encrypt data for transmission via the transmitter 102a. The transmitter 102a in the terrestrial broadcast network 102 may be adapted to utilize VHF/UHF broadcast channels to communicate information to the mobile terminals 116a, 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe for transmission by the transmitter 102a. Content media from the portal 108, which may be handled by the service provider 106 may also be multiplexed by the multiplexer 102b. The portal 108 may be an ISP service provider.

Although communication links between the terrestrial broadcast network 102 and the service provider 106, and also the communication links between the service provider 106 and the wireless service provider 104 may be wired communication links, the invention may be not so limited. Accordingly, at least one of these communication links may be wireless communication links. In an exemplary embodiment of the invention, at least one of these communication links may be an 802.x based communication link such an 802.16 or WiMax broadband access communication link. In another exemplary embodiment of the invention, at least one of these connections may be a broadband line of sight (LOS) connection.

The wireless service provider network 104 may be a cellular or personal communication service (PCS) provider. The term cellular as utilized herein refers to both cellular and PCS frequencies bands. Hence, usage of the term cellular may comprise any band of frequencies that may be utilized for cellular communication and/or any band of frequencies that may be utilized for PCS communication. The wireless service provider network 104 may utilize cellular or PCS access technologies such as GSM, CDMA, CDMA2000, WCDMA, AMPS, N-AMPS, and/or TDMA. The cellular network may be utilized to offer bi-directional services via uplink and downlink communication channels. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a, 116b may also be compliant with 802.11 based wireless networks.

In accordance with an exemplary embodiment of the invention, if the mobile terminal (MT) 116a is within an operating range of the VHF/UHF broadcasting antenna 112a and moves out of the latter's operating range and into an operating range of the VHF/UHF broadcasting antenna 112b, then VHF/UHF broadcasting antenna 112b may be adapted to provide UHF/VHF broadcast services to the mobile terminal 116a. If the mobile terminal 116a subsequently moves back into the operating range of the VHF/UHF broadcasting antenna 112a, then the broadcasting antenna 112a may be adapted to provide VHF/UHF broadcasting service to the mobile terminal 116a. In a somewhat similar manner, if the mobile terminal (MT) 116b is within an operating range of the VHF/UHF broadcasting antenna 112b and moves out of the latter's operating range and into an operating range of the broadcasting antenna 112a, then the VHF/UHF broadcasting antenna 112a may be adapted to provide VHF/UHF broadcasting service to the mobile terminal 116b. If the mobile terminal 116b subsequently moves back into the operating range of broadcasting antenna 112b, then the VHF/UHF broadcasting antenna 112b may be adapted to provide VHF/UHF broadcast services to the mobile terminal 116b.

The service provider 106 may comprise suitable interfaces, circuitry, logic and/or code that may be adapted to facilitate communication between the terrestrial broadcasting network 102 and the wireless communication network 104. In an illustrative embodiment of the invention the service provider 106 may be adapted to utilize its interfaces to facilitate exchange control information with the terrestrial broadcast network 102 and to exchange control information with the wireless service provider 104. The control information exchanged by the service provider 106 with the terrestrial broadcasting network 102 and the wireless communication network 104 may be utilized to control certain operations of the mobile terminals, the terrestrial broadcast network 102 and the wireless communication network 104.

In accordance with an embodiment of the invention, the service provider 106 may also comprise suitable interfaces, circuitry, logic and/or code that may be adapted to handle network policy decisions. For example, the service provider 106 may be adapted to manage a load on the terrestrial broadcast network 102 and/or a load on the wireless service provider network 104. Load management may be utilized to distribute the flow of information throughout the terrestrial broadcast network 104 and/or a load on the wireless service provider network 104. For example, if information is to be broadcasted via the wireless service provider network 104 to a plurality of mobile terminals within a particular cell handled by the base station 104a and it is determined that this may overload the wireless service provider network 104, then the terrestrial broadcast network 102 may be configured to broadcast the information to the mobile terminals.

The service provider 106 may also be adapted to handle certain types of service requests, which may have originated from a mobile terminal. For example, the mobile terminal 116a may request that information be delivered to it via a downlink VHF/UHF broadcast channel. However, a downlink VHF/UHF broadcast channel may be unavailable for the delivery of the requested information. As a result, the service provider 106 may route the requested information through a cellular channel via the base station 104c to the mobile terminal 116a. The requested information may be acquired from the content source 114, the ISP 107, and/or the portal 108. In another example, the mobile terminal 116b may request that information be delivered to it via a downlink cellular channel. However, the service provider 106 may determine that delivery of the information is not critical and/or the cheapest way to deliver to the mobile terminal 116b is via a downlink VHF/UHF broadcast channel. As a result, the service provider 106 may route the requested information from the ISP 107, the portal 108 or content service 114 to the mobile terminal 116b. The service provider 106 may also have the capability to send at least a portion of information to be delivered to, for example, mobile terminal 116a via the VHF/UHF broadcast channel and a remaining portion of the information to be delivered via a cellular channel.

The ISP 107 may comprise suitable logic, circuitry and/or code that may be adapted to provide content media to the service provider 106 via one or more communication links. These communication links, although not shown, may comprise wired and/or wireless communication links. The content media that may be provided by the ISP 107 may comprise audio, data, video or any combination thereof. In this regard, the ISP 107 may be adapted to provide one or more specialized information services to the service provider 106.

The portal 108 may comprise suitable logic, circuitry and/or code that may be adapted to provide content media to the service provider 106 via one or more communication links. These communication links, although not shown, may comprise wired and/or wireless communication links. The content media that may be provided by the portal 108 may comprise audio, data, video or any combination thereof. In this regard, the portal 108 may be adapted to provide one or more specialized information services to the service provider 106.

The public switched telephone network (PSTN) 110 may be coupled to the MSC 118a. Accordingly, the MSC 118a may be adapted to switch calls originating from within the PSTN 110 to one or more mobile terminals serviced by the wireless service provider 104. Similarly, the MSC 118a may be adapted to switch calls originating from mobile terminals serviced by the wireless service provider 104 to one or more telephones serviced by the PSTN 110.

The information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, a cellular channel from the ISP 107 and/or the portal 108. The request may be initiated through an uplink cellular communication path.

The mobile terminals (MTs) 116a and 116b may comprise suitable logic, circuitry and/or code that may be adapted to handle the processing of uplink and downlink cellular channels for various access technologies and broadcast UHFNHF technologies. In an exemplary embodiment of the invention, the mobile terminals 116a, 116b may be adapted to utilize one or more cellular access technologies such as GSM, GPRS, EDGE, CDMA, WCDMA, and CDMA2000. The mobile terminal may also be adapted to receive and process VHF/UHF broadcast signals in the VHF/UHF bands. For example, a mobile terminal may be adapted to receive and process DVB-H signals. A mobile terminal may be adapted to request information via a first cellular service and in response, receive corresponding information via a VHF/UHF broadcast service. A mobile terminal may also be adapted to request information from a service provider via a cellular service and in response, receive corresponding information via a data service, which is provided via the cellular service. A mobile terminal may also be adapted to request Internet information from an Internet service provider. The mobile terminals may be adapted to receive VHF/UHF broadcast information from the VHF/UHF broadcast antennas 112a and 112b. In some instances, the mobile terminal may communicate corresponding uplink information via an uplink cellular communication channel.

In one embodiment of the invention, a mobile terminal may be adapted to utilize a plurality of broadcast integrated circuits for receiving and processing VHF/UHF channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VHF/UHF channel.

In another embodiment of the invention, a mobile terminal may be adapted to utilize a single broadcast integrated circuit for receiving and processing VHF/UHF channels, and a single cellular integrated circuit for receiving and processing cellular or PCS channels. In this regard, the single cellular integrated circuit may be adapted to handle different cellular access technologies. For example, at least one of the cellular integrated circuit may be adapted to handle GSM, and at least one of the cellular integrated circuits may be adapted to handle WCDMA. For broadcast channels, the single broadcast integrated circuit may be adapted to handle at least one VHF/UHF channel. Each of the mobile terminals may comprise a single memory interface that may be adapted to handle processing of the broadcast communication information and processing of cellular communication information. In this regard, an uplink cellular communication path may be utilized to facilitate receiving of broadcast information via a broadcast communication path.

In another embodiment of the invention, a mobile terminal may be adapted to utilize a single integrated circuit for receiving and processing broadcast VHF/UHF channels, and for receiving and processing cellular or PCS channels. In this regard, the single broadcast and cellular integrated circuit may be adapted to handle different cellular access technologies. For example, the single integrated circuit may comprise a plurality of modules each of which may be adapted to receive and process a particular cellular access technology or a VHF/UHF broadcast channel. Accordingly, a first module may be adapted to handle GSM, a second module may be adapted to handle WCDMA, and a third module may be adapted to handle at least one VHF/UHF channel.

Figure 1B:
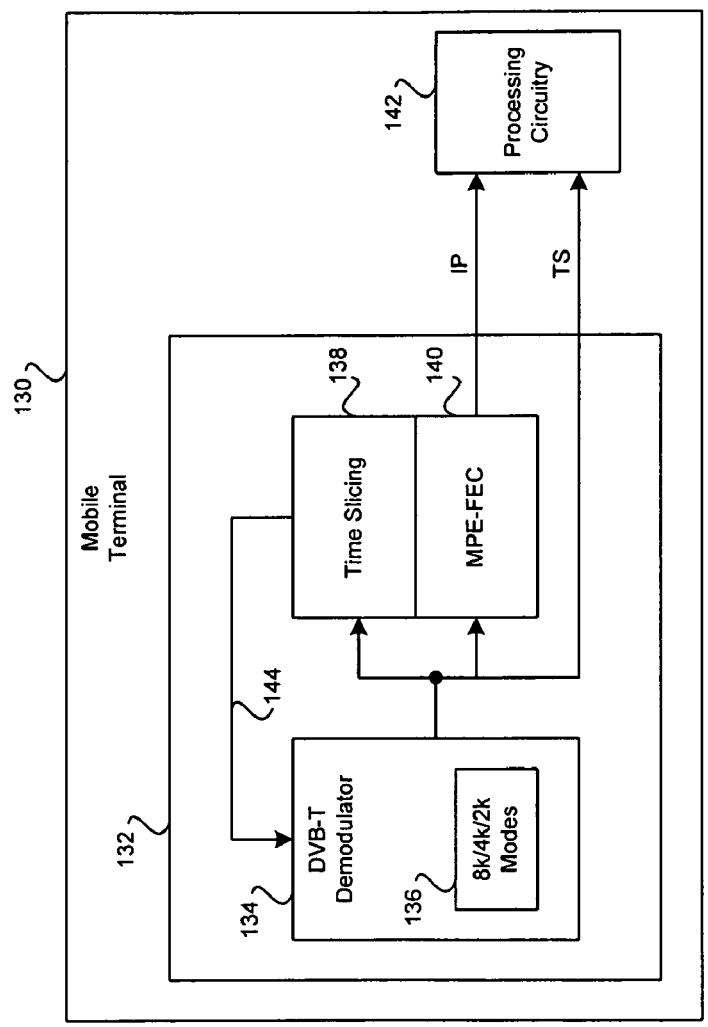
FIG. 1*b* is a high-level block diagram of exemplary DVB-H receiver circuitry in a mobile terminal, which may be utilized in connection with an embodiment of the invention.

FIG. 1b is a high-level block diagram of exemplary DVB-H receiver circuitry in a mobile terminal, which may be utilized in connection with an embodiment of the invention. Referring to FIG. 1b, there is shown a mobile terminal 130. The mobile terminal 130 may comprise a DVB-H demodulator 132 and processing circuitry block 142. The DVB-H demodulator block 132 may comprise a DVB-T demodulator 134, time slicing block 138, and MPE-FEC block 140.

The DVB-T demodulator 134 may comprise suitable circuitry, logic and/or code that may be adapted to demodulate a terrestrial DVB signal. In this regard, the DVB-T demodulator 134 may be adapted to downconvert a received DVB-T signal to a suitable bit rate that may be handled by the mobile terminal 130. The DVB-T demodulator may be adapted to handle 2k, 4k and/or 8k modes.

The time slicing block 138 may comprise suitable circuitry, logic and/or code that may be adapted to minimize power consumption in the mobile terminal 130, particularly in the DVB-T demodulator 134. In general, time slicing reduces average power consumption in the mobile terminal by sending data in bursts via much higher instantaneous bit rates. In order to inform the DVB-T demodulator 134 when a next burst is going to be sent, a delta indicating the start of the next burst is transmitted within a current burst. During transmission, no data for an elementary stream (ES) is transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference 144 indicates a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams. As a result, during decoding, the MPE-FEC block 140 may generate datagrams that are error-free even in instances when receive channel conditions are poor. The processing circuitry block 142 may comprise suitable processor, circuitry, logic and/or code that may be adapted to process IP datagrams generated from an output of the MPE-FEC block 140. The processing circuitry block 142 may also be adapted to process transport stream packets from the DVB-T demodulator 134.

In operation, the DVB-T demodulator 134 may be adapted to receive an input DVB-T RF signal, demodulate the received input DVB-T RF signal so as to generate data at a much lower bit rate. In this regard, the DVB-T demodulator 134 recovers MPEG-2 transport stream (TS) packets from the input DVB-T RF signal. The MPE-FEC block 140 may then correct any error that may be located in the data and the resulting IP datagrams may be sent to the processing circuitry block 142 for processing. Transport stream packets from the DVB-T demodulator 134 may also be communicated to the processing circuitry block 142 for processing.

Figure 1C:
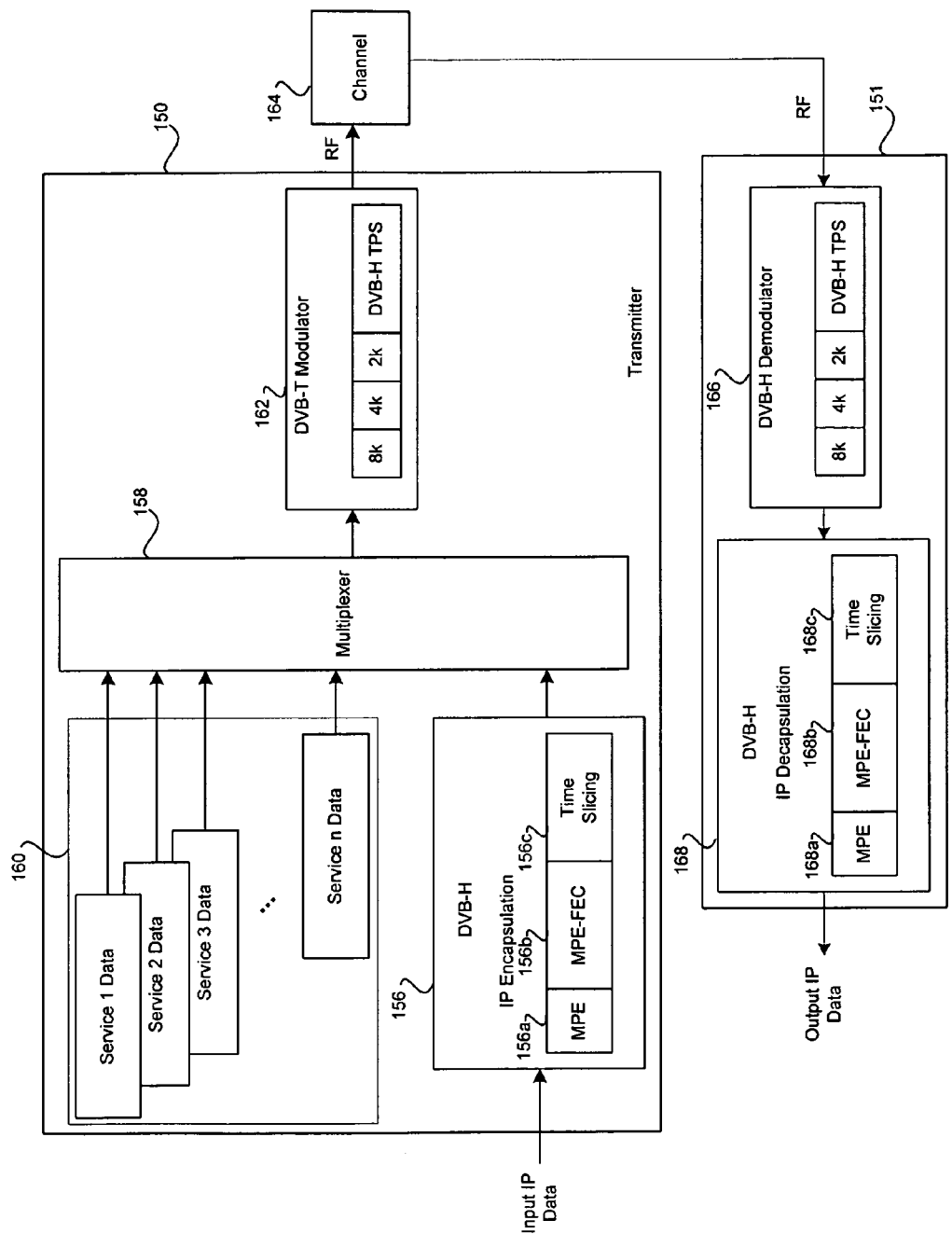
FIG. 1*c* is a block diagram illustrating the sharing of a multiplexer (MUX) by a plurality of MPEG2 services, which may be utilized in connection with an embodiment of the invention.

FIG. 1c is a block diagram illustrating the sharing of a multiplexer (MUX) by a plurality of MPEG2 services, which may be utilized in connection with an embodiment of the invention. Referring to FIG. 1c, there is shown a transmitter block 150, a receiver block 151 and a channel 164. The transmitter block 150 may comprise a DVB-H encapsulator block 156, a multiplexer 158, and a DVB-T modulator 162. Also shown associated with the transmitter block 150 is a plurality of service data collectively referenced as 160. The receiver block 151 may comprise a DVB-H demodulator block 166 and a DVB-H decapsulation block 168. The DVB-H encapsulator block 156 may comprise MPE block 156a, MPE-FEC block 156b and time slicing block 156c.

The multiplexer 156 may comprise suitable logic circuitry and/or code that may be adapted to handle multiplexing of IP encapsulated DVB-H data and service data. The plurality of service data collectively referenced as 160 may comprise MPEG-2 formatted data, which may comprise for example, audio, video and/or data. The DVB-T modulator 162 may comprise suitable logic circuitry and/or code that may be adapted to generate an output RF signal from the transmitter block 150.

The DVB-H demodulator block 166 associated with the receiver block 151 is similar to the DVB-H demodulator block 132 of FIG. 1e. The DVB-H decapsulation block 168 may comprise MPE block 168a, MPE-FEC block 168b and time slicing block 168c. The DVB-H decapsulation block 168 may comprise suitable logic, circuitry and/or code that may be adapted decapsulate the IP data that was encapsulated and multiplexed by the transmitter block 150. The output of the DVB-H demodulator 166 is the transport stream packets, which comprised the multiplexed output generated by the multiplexer 158.

Figure 2:
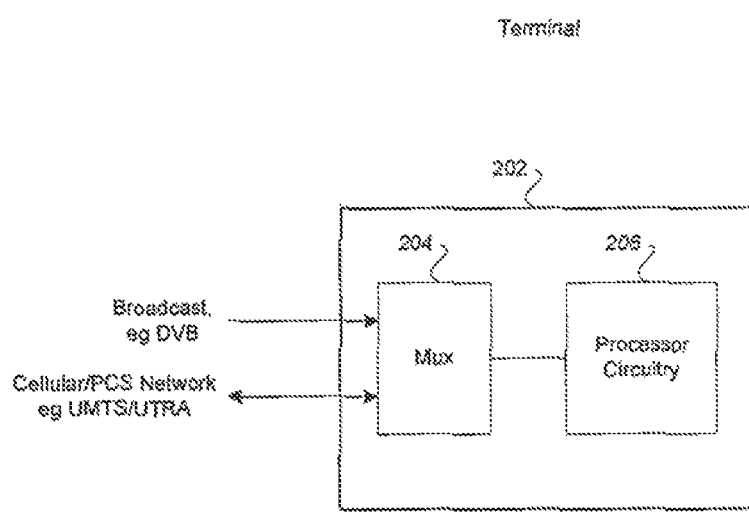
FIG. 2 is a block diagram of a mobile terminal that is adapted to receive VHF/UHF broadcasts and cellular communications, in accordance with an embodiment of the invention.

FIG. 2 is a block diagram of a mobile terminal that is adapted to receive VHF/UHF broadcasts and cellular communications, in accordance with an embodiment of the invention. Referring to FIG. 2, there is shown mobile terminal (MT) or handset 202. The mobile terminal 202 may comprise multiplexer (MUX) 204 and processing circuitry 206.

The multiplexer 204 may comprise suitable logic circuitry and/or code that may be adapted to multiplex incoming signals, which may comprise VHF/UHF broadcast channel and at least one cellular channel. The cellular channel may be within the range of both cellular and PCS frequency bands.

The processing circuitry 206 may comprise, for example, an RF integrated circuit (RFIC) or RF front end (RFFE). In this regard, the processing circuitry 206 may comprise at least one receiver front end (RFE) circuit. A first of these circuits may be adapted to handle processing of the VHF/UHF broadcast channel and a second of these circuits may be adapted to handle a cellular channel. In an embodiment of the invention, a single RFIC may comprise a plurality of RFE processing circuits, each of which may be adapted to process a particular cellular channel. Accordingly, a single RFIC comprising a plurality of cellular RFE processing circuits may be adapted to handle a plurality of cellular channels. In one embodiment of the invention, a plurality of VHF/UHF RFE processing circuits may be integrated in a single RFIC. In this regard, a mobile terminal may be adapted to simultaneously handle a plurality of different VHF/UHF channels. For example, a mobile terminal may be adapted to simultaneously receive a first VHF/UHF channel bearing video and a second VHF/UHF channel bearing audio.

Figure 3A:
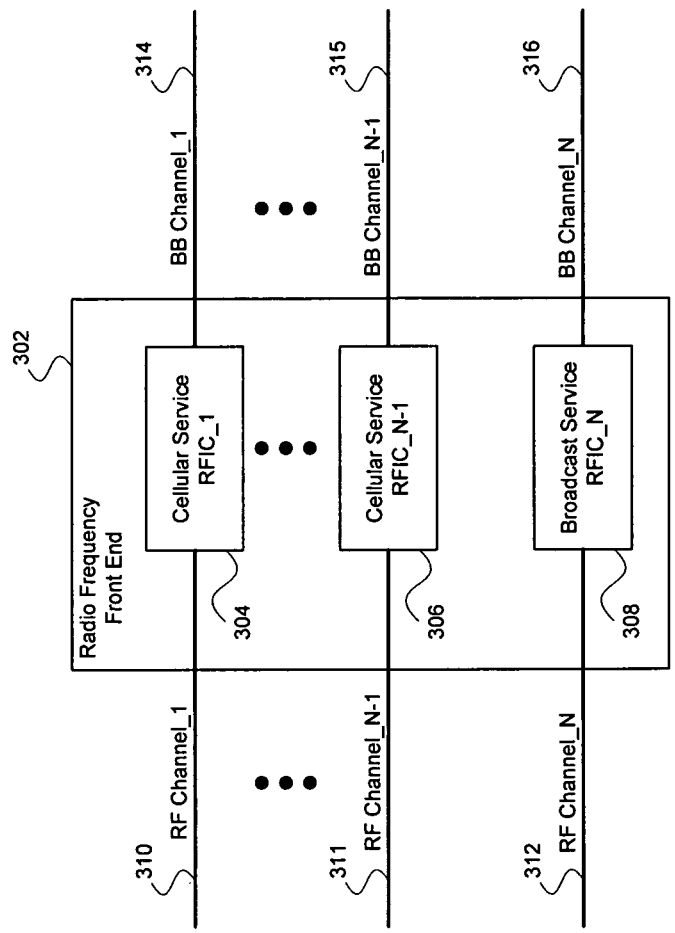
FIG. 3*a* is a block diagram illustrating an exemplary radio frequency front end (RFFE) comprising a plurality of cellular service radio frequency integrated circuits (RFIC) and a single broadcast service RFIC in accordance with an embodiment of the invention.

FIG. 3a is a block diagram illustrating an exemplary radio frequency front end (RFFE) comprising a plurality of cellular service RFICs and a single broadcast service RFIC in accordance with an embodiment of the invention. Referring to FIG. 3a, there is shown an RFFE 302 comprising a plurality of cellular service RFICs starting with cellular service RFIC_1 304 and continuing to cellular service RFIC_N-1 306. Also shown in FIG. 3a is a broadcast service RFIC 308, and a plurality of channels 310, 311, 312, 314, 315, and 316. The cellular service RFIC_1 304 may process an RF signal, such as RF Channel_1 310, and a baseband signal, such as BB Channel_1 314. The RFIC 304 may be a bidirectional IC that may be adapted to process a received RF signal 310 to a transmitted baseband signal 314. The RFIC 304 may also be adapted to process a received baseband signal 314 to a transmitted RF signal 310.

The cellular service RFIC_N-1 306 may process an RF signal, such as RF Channel_N-1 311, and a baseband signal, such as BB Channel_N-1 315. The RFIC 306 may be a bidirectional IC that may be adapted to process a received RF signal 311 and to generate a corresponding baseband signal 315. The RFIC 306 may also be adapted to process a received baseband signal 315 and to generate a corresponding RF signal 311. The broadcast service RFIC_N 308 may process an RF signal, such as RF Channel_N 312, and a baseband signal, such as BB Channel_N 316. The broadcast service RFIC_N 308 may be adapted to process a received RF signal 312 and to generate a corresponding baseband signal 316.

The cellular service RFICs 304 and 306 may each be independently adapted to receive and transmit RF signals that are assigned to at least one of a plurality of cellular frequency band communications services. These RF signals may comprise GSM operating in the 900 MHz and 1.8 GHz frequency bands, and WCDMA operating in the 2.1 GHz frequency band. The broadcast service RFIC 308 may be adapted to receive at least one RF signal from the VHF/UHF broadcasting services. The invention does not limit the number of RFICs or types of RFICs that an RFFE may comprise.

Figure 3B:
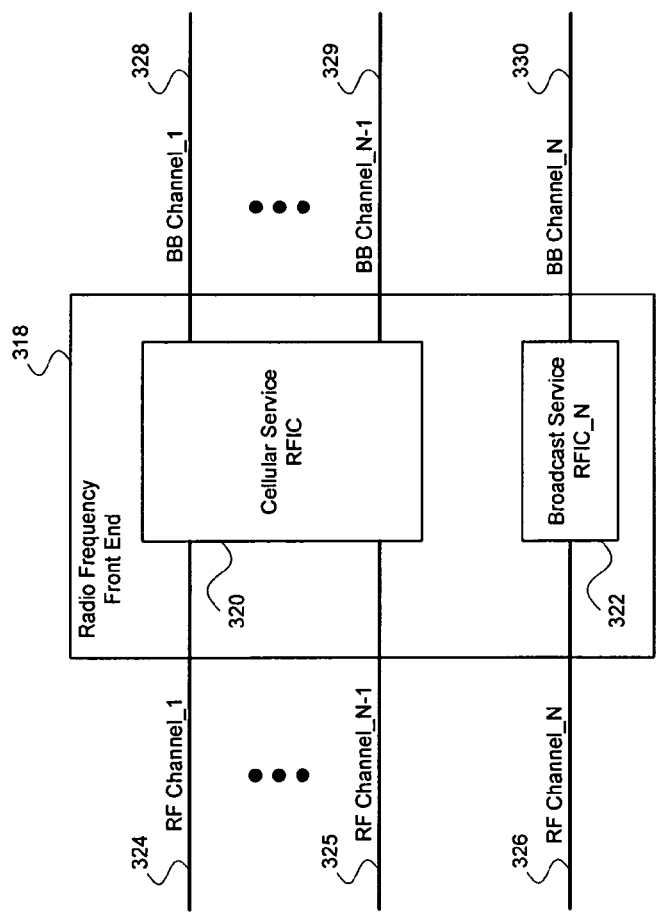
FIG. 3*b* is a block diagram illustrating an exemplary RFFE comprising a single cellular service RFIC and a single broadcast service RFIC in accordance with an embodiment of the invention.

FIG. 3b is a block diagram illustrating an exemplary RFFE comprising a single cellular service RFIC and a single broadcast service RFIC in accordance with an embodiment of the invention. Referring to FIG. 3b, there is shown an RFFE 318 comprising a cellular service RFIC 320, a broadcast service RFIC 322, and a plurality of channels 324, 325, 326, 328, 329, and 330. The cellular service RFIC 320 may process a plurality of radio frequency (RF) signals, starting with RF Channel_1 324 and continuing to RF Channel_N-1 325, and a plurality of baseband signals, starting with BB Channel_1 328 and continuing to BB Channel_N-1 329. The RFIC 320 may be a bidirectional IC that may be adapted to process a received RF signal 324 and to generate a corresponding baseband signal 328. The RFIC 320 may also be adapted to process a received baseband signal 328 and to generate a corresponding RF signal 324. Correspondingly, the RFIC 320 may be adapted to process a received RF signal 325 and to generate a corresponding transmitted baseband signal 329, and may be adapted to process a received baseband signal 329 and to generate a corresponding RF signal 325. The broadcast service RFIC_N 322 may also process a radio frequency (RF) signal, such as RF Channel_N 326, and a baseband (BB) signal, such as BB Channel_N 330. The broadcast service RFIC_N 322 may be adapted to process a received RF signal 326 and to generate a corresponding baseband signal 330.

The cellular service RFIC 320 may be adapted to receive and transmit RF signals that are assigned to at least one of a plurality of cellular frequency band communications services. These RF signals may comprise GSM operating in the 900 MHz and 1.8 GHz frequency bands, and WCDMA operating in the 2.1 GHz frequency band. The broadcast service RFIC_N 322 may be adapted to receive RF signals from VHF/UHF broadcasting services.

Figure 3C:
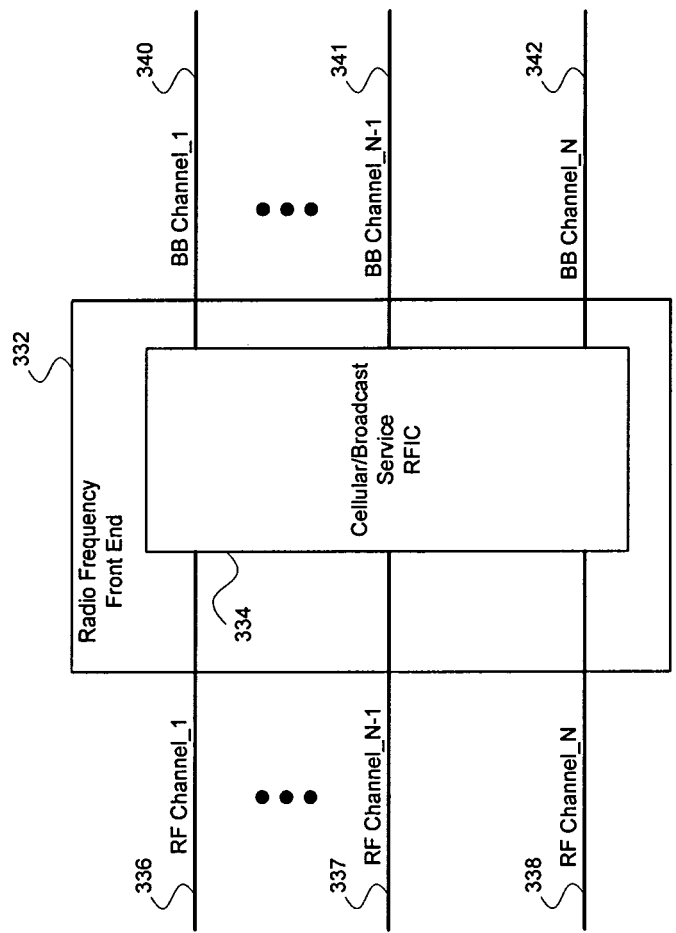
FIG. 3*c* is a block diagram illustrating an exemplary RFFE comprising a single cellular/broadcast service RFIC in accordance with an embodiment of the invention.

FIG. 3c is a block diagram illustrating an exemplary RFFE comprising a single cellular/broadcast service RFIC in accordance with an embodiment of the invention. Referring to FIG. 3c, there is shown an RFFE 332 comprising a cellular/broadcast service RFIC 334, and a plurality of channels 336, 337, 338, 340, 341, and 342. In FIG. 3c, channels 336, 337, 340, and 341 may be associated with cellular communication services, while channels 338 and 342 may be associated with VHF/UHF broadcast services. The cellular/broadcast service RFIC 334 may process a plurality of RF signals, starting with RF Channel_1 336 and continuing to RF Channel_N-1 337 and to RF Channel_N 338, and a plurality of baseband signals, starting with BB Channel_1 340 and continuing to BB Channel_N-1 341 and to RF Channel_N 342. The RFIC 334 may be a bidirectional IC that may be adapted to process a received RF signal 336 and to generate a corresponding baseband signal 340. The RFIC 334 may also be adapted to process a received baseband signal 340 and to generate a corresponding RF signal 336. The RFIC 334 may also be adapted to process a received RF signal 337 and to generate a corresponding baseband signal 341, and may process a received baseband signal 341 and generate a corresponding RF signal 337. The cellular/broadcast service RFIC 334 may also process a received RF signal, such as RF Channel_N 338, and a baseband signal, such as BB Channel_N 342. The cellular/broadcast service RFIC 334 may be adapted to process a received RF signal 338 and to generate a corresponding baseband signal 342.

The cellular/broadcast service RFIC 334 may be adapted to receive and transmit RF signals that are assigned to at least one of a plurality of cellular frequency band communications services. These RF signals may comprise GSM operating in the 900 MHz and 1.8 GHz frequency bands, and WCDMA operating in the 2.1 GHz frequency band. The cellular/broadcast service RFIC 334 may also be adapted to receive RF signals from VHF/UHF broadcasting services.

Figure 3D:
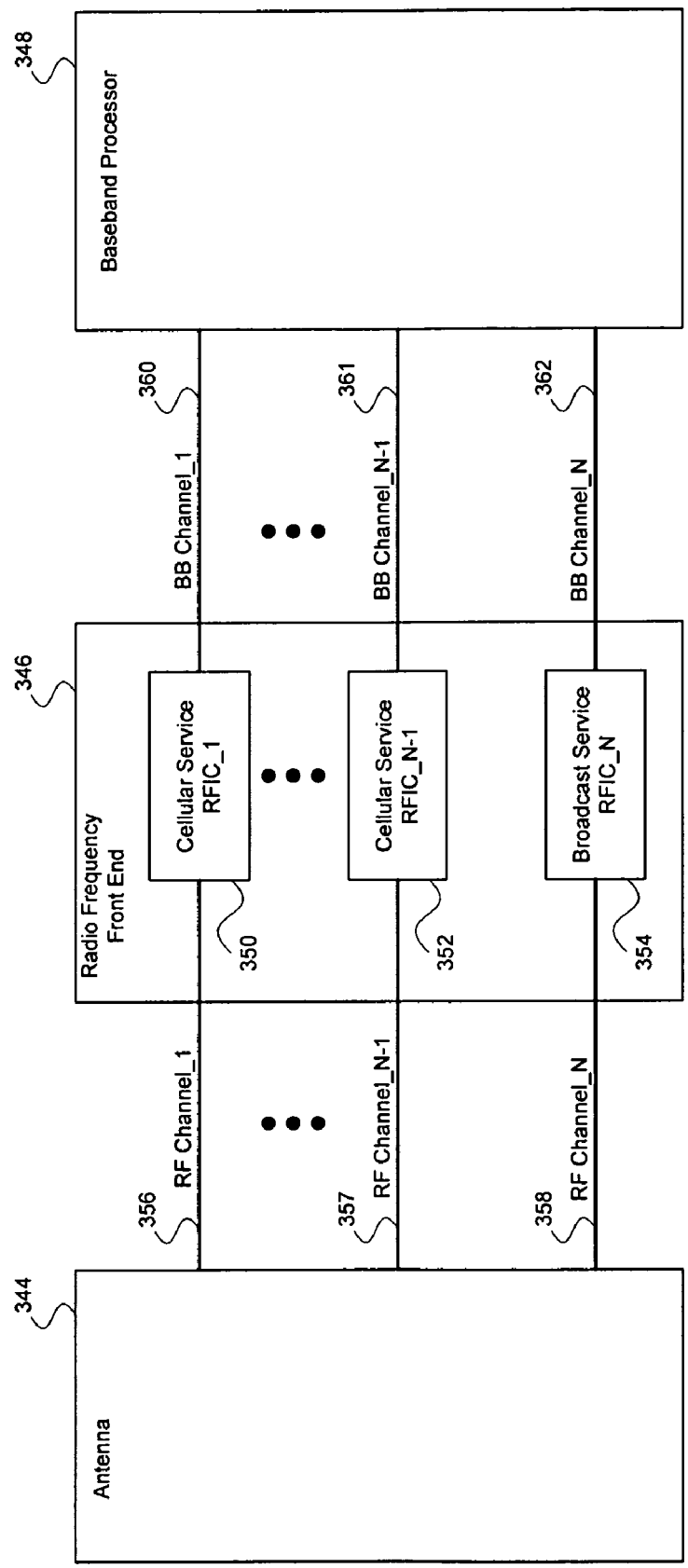
FIG. 3*d* is a block diagram illustrating an exemplary RFFE comprising a plurality of cellular service RFICs and a single broadcast service RFIC coupled to an antenna and to a baseband processor (BBP) in accordance with an embodiment of the invention.

FIG. 3d is a block diagram illustrating an exemplary RFFE comprising a plurality of cellular service RFICs and a single broadcast service RFIC coupled to an antenna and to a baseband processor (BBP) in accordance with an embodiment of the invention. Referring to FIG. 3d, there is shown an antenna block 344, RFFE 346, BBP 348, cellular service RFIC_1 350, cellular service RFIC_N-1 352, broadcast service RFIC_N 354, and a plurality of channels 356, 357, 358, 360, 361, and 362. The cellular service RFIC_1 350 may receive RF signals, RF Channel_1 356, from the antenna block 344, and transmit baseband signals, BB Channel_1 360, to the BBP 348. The cellular service RFIC_1 350 may receive baseband signals, BB Channel_1 360, from the BBP 348, and transmit RF signals, RF Channel_1 356, to the antenna block 344. The signals 356 and 360 may be associated with cellular communication services. The cellular service RFIC_N-1 352 may receive RF signals, RF Channel_N-1 357, from the antenna block 344, and transmit baseband signals, BB Channel_1 361, to the BBP 348. The cellular service RFIC_N-1 352 may receive baseband signals, BB Channel_1 361, from the BBP 348, and transmit RF signals, RF Channel_N-1 357, to the antenna block 344. The signals 357 and 361 may be associated with cellular communication services. The broadcast service RFIC_N 354 may receive RF signals, RF Channel_N 358, from the antenna block 344, and transmit baseband signals, BB Channel_1 362, to the BBP 348. The signals 358 and 362 may be associated with VHF/UHF broadcast services.

The antenna block 344 may be adapted to receive at least one of a plurality of signals. For example, the antenna block 344 may be adapted to receive a plurality of signals in the GSM band, a plurality of signals in the WCDMA and/or a plurality of signals in the VHF/UHF frequency band. U.S. application Ser. No. 11/010,883, U.S. application Ser. No. 11/011,006, U.S. application Ser. No. 11/010,487, all of which are filed on even date herewith and disclose various antenna configurations that may be utilized for a plurality of operating frequency bands.

Figure 3E:
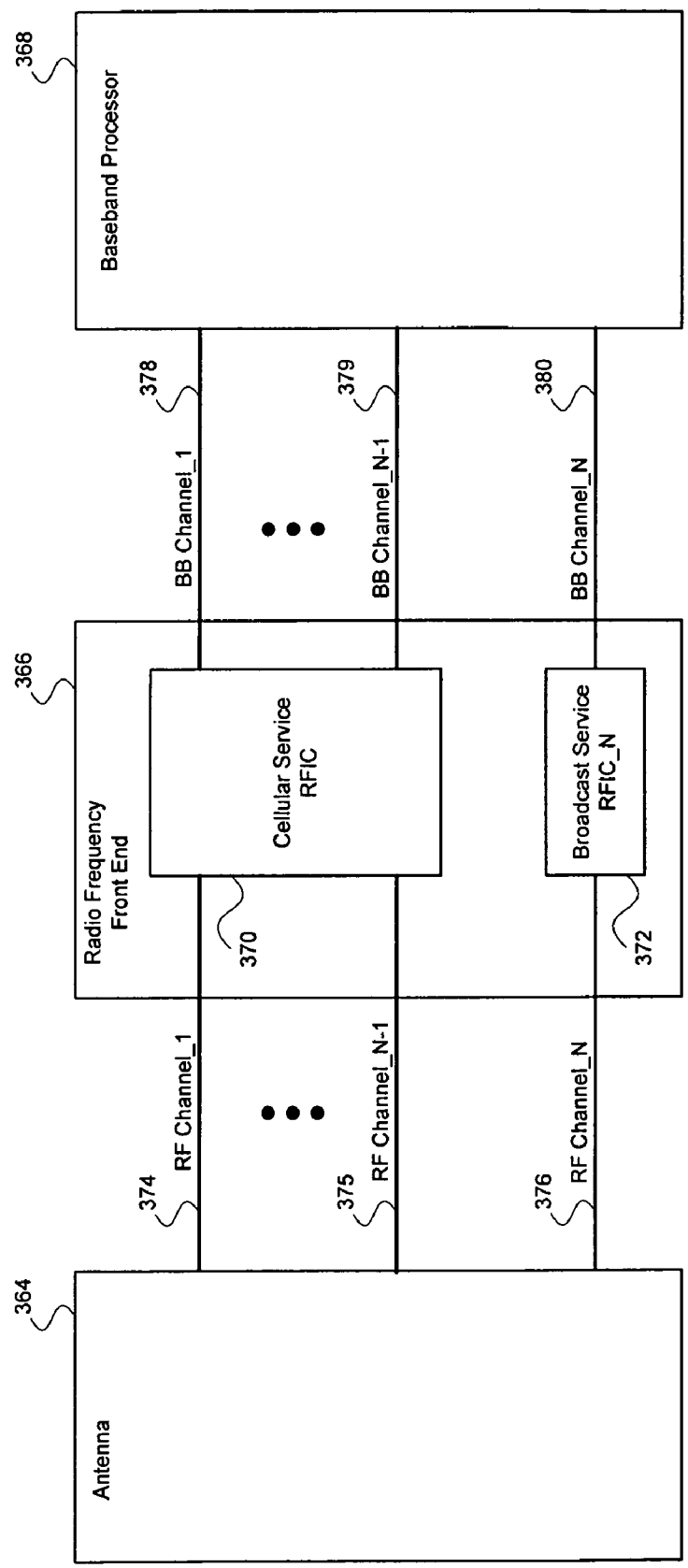
FIG. 3*e* is a block diagram illustrating an exemplary RFFE comprising a single cellular service RFIC and a single broadcast service RFIC coupled to an antenna and to a baseband processor (BBP) in accordance with an embodiment of the invention.

FIG. 3e is a block diagram illustrating an exemplary RFFE comprising a single cellular service RFIC and a single broadcast service RFIC coupled to an antenna and to a baseband processor (BBP) in accordance with an embodiment of the invention. Referring to FIG. 3e, there is shown an antenna block 364, RFFE 366, BBP 368, cellular service RFIC 370, broadcast service RFIC_N 372, and a plurality of channels 374, 375, 376, 378, 379, and 380. The cellular service RFIC 370 may receive RF signals, RF Channel_1 374, from the antenna block 364, and transmit baseband signals, BB Channel_1 378, to the BBP 368. The cellular service RFIC 370 may receive baseband signals, BB Channel_1 378, from the BBP 368, and transmit RF signals, RF Channel_1 374, to the antenna block 364. The signals 374 and 378 may be associated with cellular communication services. The cellular service RFIC 370 may receive RF signals, RF Channel_N-1 375, from the antenna block 364, and transmit baseband signals, BB Channel_1 379, to the BBP 368. The cellular service RFIC 370 may receive baseband signals, BB Channel_1 379, from the BBP 368, and transmit RF signals, RF Channel_N-1 375, to the antenna block 364. The signals 375 and 379 may be associated with cellular communication services. The broadcast service RFIC_N 372 may receive RF signals, RF Channel_N 376, from the antenna block 364, and transmit baseband signals, BB Channel_1 380, to the BBP 368. The signals 376 and 380 may be associated with VHF/UHF broadcast services.

Figure 3F:
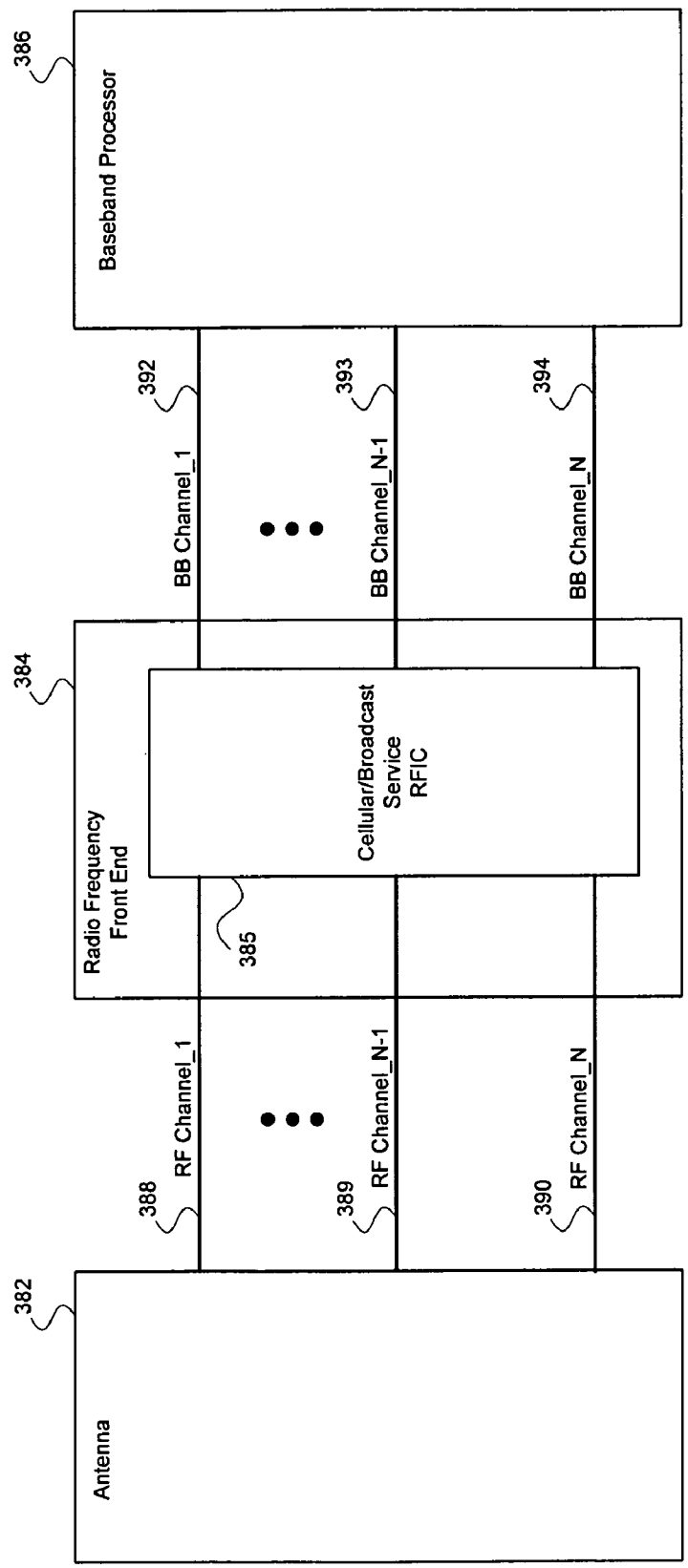
FIG. 3f is a block diagram illustrating an exemplary RFFE comprising a single cellular/broadcast service RFIC coupled to an antenna and to a baseband processor (BBP) in accordance with an embodiment of the invention.

FIG. 3f is a block diagram illustrating an exemplary RFFE comprising a single cellular/broadcast service RFIC coupled to an antenna and to a baseband processor (BBP) in accordance with an embodiment of the invention. Referring to FIG. 3f, there is shown an antenna block 382, RFFE 384, BBP 386, cellular/broadcast service RFIC 385, and a plurality of channels 388, 389, 390, 392, 393, and 394. The cellular/broadcast service RFIC 385 may receive RF signals, RF Channel_1 388, from the antenna block 382, and transmit baseband signals, BB Channel_1 392, to the BBP 386. The cellular/broadcast service RFIC 385 may receive baseband signals, BB Channel_1 392, from the BBP 386, and transmit RF signals, RF Channel_1 388, to the antenna block 382. The signals 388 and 392 may be associated with cellular communication services. The cellular/broadcast service RFIC 385 may receive RF signals, RF Channel_1 389, from the antenna block 382, and transmit baseband signals, BB Channel_1 393, to the BBP 386. The cellular/broadcast service RFIC 385 may receive baseband signals, BB Channel_1 393, from the BBP 386, and transmit RF signals, RF Channel_1 389, to the antenna block 382. The signals 388 and 392 may be associated with cellular communication services. Cellular/broadcast service RFIC 385 may receive RF signals, RF Channel_1 390, from the antenna block 382, and transmit baseband signals, BB Channel_1 394, to the BBP 386. The signals 390 and 394 may be associated with VHF/UHF broadcast services.

Figure 4A:
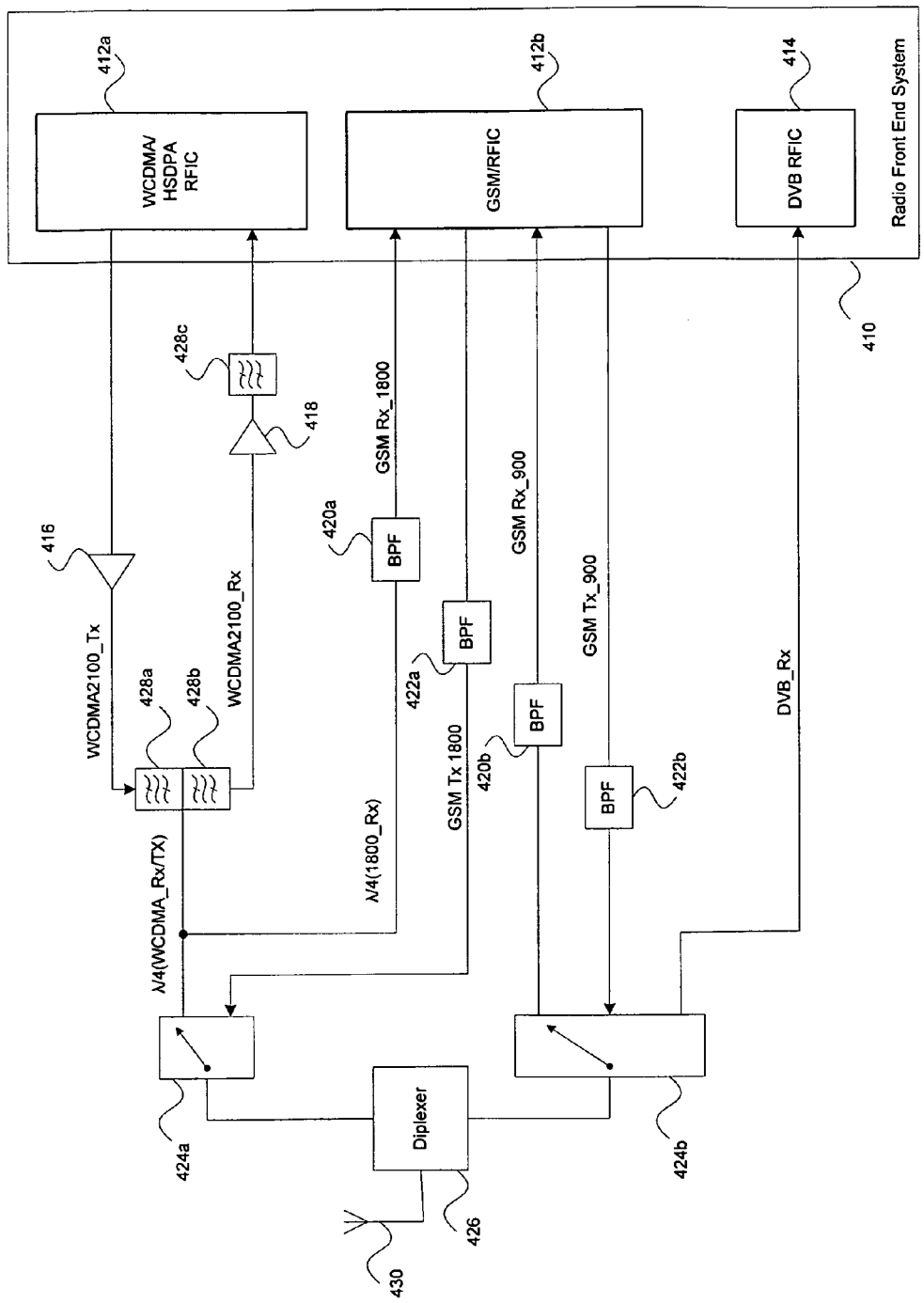
FIG. 4a is a block diagram illustrating an exemplary RFFE comprising a plurality of cellular service RFICs and a single broadcast service RFIC coupled to a single antenna.

FIG. 4a is a block diagram illustrating an exemplary RFFE comprising a plurality of cellular service RFICs and a single broadcast service RFIC coupled to a single antenna. Referring to FIG. 4a, there is shown an RFFE 410, a power amplifier 416, a low noise amplifier 418, a plurality of bandpass filters BPF 420a and BPF 420b, a plurality of low pass filters BPF 422a and BPF 422b, a plurality of switches 424a and 424b, a diplexer 426, a plurality of polyphase filters 428a, 428b and 428c and an antenna 430. The RFFE 410 may comprise WCDMA/HSDPA RFIC 412a, GSM RFIC 412b, and DVB RFIC 414. The WCDMA/HSDPA RFIC 412a receives and transmits RF signals for the WCDMA cellular service in the 2.1 GHz frequency band. The RFIC 412b receives and transmits RF signals for the GSM cellular service in the 900 MHz and 1.8 GHz frequency bands. The RFIC 414 receives RF signals from broadcast services in the VHF/UHF frequency bands.

While the RFIC 414 as shown in FIG. 4a supports the DVB standard, the invention may not be so limited. In this regard, a plurality of RFICs that support digital television broadcasting (DTB) may be utilized. For example, at least one RFIC may be utilized to support advanced standards technical committee (ATSC) systems, digital video broadcast (DVB) systems, and/or integrated service digital broadcasting (ISDB) systems.

The WCDMA/HSDPA RFIC 412a may comprise suitable logic, circuitry and/or code that may be adapted to receive and transmit a WCDMA/HSDPA channel to process RF voice, data and/or control information. This channel may be divided into overlapping physical and logical channels. The physical channels may be uniquely defined by spreading codes and the logical channels, for example, control, voice and data channels may comprise a group of bits, frames and fields. The GSM RFIC 412b may comprise suitable logic, circuitry and/or code that may be adapted to receive and transmit a plurality of RF channels in the 900 MHz and the 1800 MHz band, for example. The radio channel structure for a GSM mobile station may be frequency division duplex (FDD), for example. By utilizing the FDD channel division, where data may be transmitted on one frequency and received on another frequency, the mobile terminal may receive and transmit at different times. The radio frequency separation of forward (downlink) and reverse (uplink) frequencies on the 900 MHz band may be 45 MHz, for example. The transmit band for the base station may be 935 MHz-960 MHz, for example, and the transmit band for the mobile terminal may be 890 MHz-915 MHz, for example. Similarly, the transmit band for the base station in the 1800 MHz band may be 1805 MHz-1880 MHz, for example, and the transmit band for the mobile terminal in the 1800 MHz band may be 1710 MHz-1785 MHz, for example. The DVB RFIC 414 may comprise suitable logic, circuitry and/or code that may be adapted to receive and deliver multimedia and other data to a mobile terminal via a VHF/UHF broadcast channel, for example. The payload utilized by DVB-H may be either IP datagrams or other network layer datagrams encapsulated into multiprotocol encapsulated sections.

The power amplifier 416 may be adapted to provide a high output current to drive an antenna, which may be a low-impedance load and may be adapted to amplify the signal received from the WCDMA/HSDPA RFIC 412*a* and transmit it to the polyphase filter 428*a*. The low noise amplifier LNA 418 may comprise suitable logic, circuitry, and/or code that may be adapted to amplify the output of the polyphase filter 428*b*. The bandpass filters 420*a* and 420*b* may comprise suitable logic, circuitry, and/or code that may be adapted to filter the receive cellular broadcast channels in the 1800 MHz band and 900 MHz band respectively. The bandpass filter 420*a* may be adapted to output frequencies within digital cellular system (DCS) 1800 band, which may provide a GSM downlink in the range of about 1805 MHz-1880 MHz. The bandpass filter 420*b* may be adapted to output frequencies within GSM 900 band, which may provide GSM downlink signals in the range of about 925 MHz-960 MHz, for example. The bandpass filters 422*a* and 422*b* may comprise suitable logic, circuitry, and/or code that may be adapted to filter the transmitted cellular broadcast channels in the 1800 MHz band and 900 MHz band respectively.

The switch 424*a* may comprise suitable logic, circuitry, and/or code that may be adapted to switch between a transmit or receive channel for the WCDMA and GSM 1800 MHz band channels. The switch 424*b* may comprise suitable logic, circuitry, and/or code that may be adapted to switch between a transmit or receive channel for the GSM 900 MHz band channel and a receive channel for the DVB broadcast channel. The diplexer 426 may comprise suitable logic, circuitry, and/or code that may be adapted to parallely feed a single antenna, for example, antenna 430 to two transmitters at the same or different frequencies without the transmitters interfering with each other and may couple a transmitter and receiver to the same antenna, for example, antenna 430 for use in mobile communications.

The polyphase filters 428*a*, 428*b* and 428*c* may be adapted to selectively filter signals without the need of using high Q bandpass sections. Selectivity may be ensured by utilizing polyphase signals and a plurality of low-pass filter sections where matching driven power consumption is a variable. The polyphase filter 428*a* may be adapted to receive the amplified output from the power amplifier 416 and generate a quad wavelength ($\lambda$/4) output to the switch 424*a* by selectively filtering the WCDMA transmit channel. The polyphase filter 428*b* may be adapted to receive the quad wavelength ($\lambda$/4) output of the switch 424*a* and generate an input to the LNA 418. The polyphase filter 428*c* may be adapted to receive the amplified output from the LNA 418 and generate an output to the WCDMA/HSDPA RFIC 412*a*. The antenna 430 may be adapted to transmit and receive signals to the diplexer 426.

The antenna 430 may be coupled to the diplexer 426. The diplexer 426 may be coupled to a plurality of switches for example, 424*a* and 424*b*. The switch 424*a* may be adapted to switch between one or more states. In one state, for example, the switch 424*a* may be coupled to the polyphase filters 428*a* and 428*b* in the WCDMA 2100 MHz band transmit and receive channels respectively and the bandpass filter 420*a* in the GSM 1800 MHz band receive channel. In another state, for example, the switch 424*a* may be coupled to the bandpass filter 422*a* in the GSM 1800 MHz band transmit channel. The switch 424*b* may be adapted to switch between one or more states. In one state, for example, the switch 424*b* may be coupled to the bandpass filter 420*b* that may be adapted to input frequencies within GSM 900 MHz receive band. In another state, for example, the switch 424*b* may be coupled to the bandpass filter 422*b* in the GSM 900 MHz band transmit channel. In another state, for example, the switch 424*b* may be coupled to the DVB RFIC 414 via the VHF/UHF broadcast channel.

The WCDMA/HSDPA RFIC 412*a* may be coupled to the power amplifier 416 in the transmit section of the WCDMA channel and may be coupled to the polyphase filter 428*c* in the receive section of the WCDMA channel. The output of the power amplifier 416 may be coupled to the polyphase filter 428*a*. The LNA 418 may be coupled to the output of the polyphase filter 428*b* and the input of the polyphase filter 428*c*. The GSM RFIC 412*b* may be coupled to the output of the BPF 420*a* in the GSM 1800 MHz band receive channel and may be coupled to the input of the BPF 422*a* in the 1800 MHz transmit channel. The GSM RFIC 412*b* may be further coupled to the output of the BPF 420*b* in the GSM 900 MHz band receive channel and may be coupled to the input of the BPF 422*b* in the 900 MHz transmit channel.

Figure 4B:
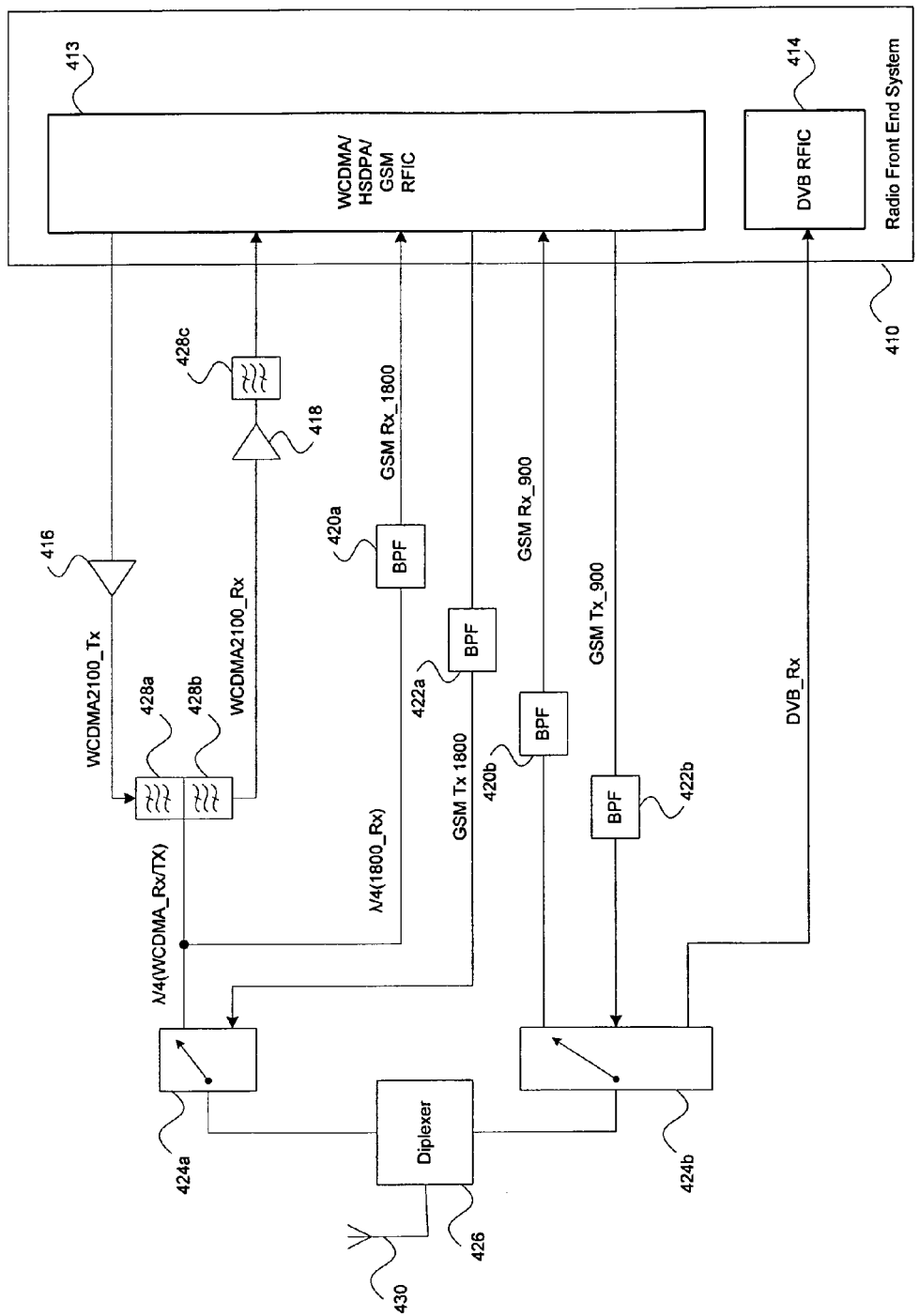
FIG. 4b is a block diagram illustrating an exemplary RFFE comprising a single cellular service RFIC and a single broadcast service RFIC coupled to a single antenna.

FIG. 4*b* is a block diagram illustrating an exemplary RFFE comprising a single cellular service RFIC and a single broadcast service RFIC coupled to a single antenna. Referring to FIG. 4*b* shows an RFFE 410, a power amplifier 416, a low noise amplifier 418, a plurality of bandpass filters BPF 420*a* and BPF 420*b*, a plurality of low pass filters BPF 422*a* and BPF 422*b*, a plurality of switches 424*a* and 424*b*, a diplexer 426, a plurality of polyphase filters 428*a*, 428*b* and 428*c* and an antenna 430. The RFFE 410 may comprise WCDMA/HSDPA/GSM RFIC 413, and DVB RFIC 414. The RFIC 413 receives and transmits RF signals for the WCDMA cellular service in the 2.1 GHz frequency band. The WCDMA/HSDPA/GSM RFIC 413 also receives and transmits RF signals for the GSM cellular service in the 900 MHz and 1.8 GHz frequency bands. The RFIC 414 receives RF signals from broadcast services in the VHF/UHF frequency bands.

Figure 4C:
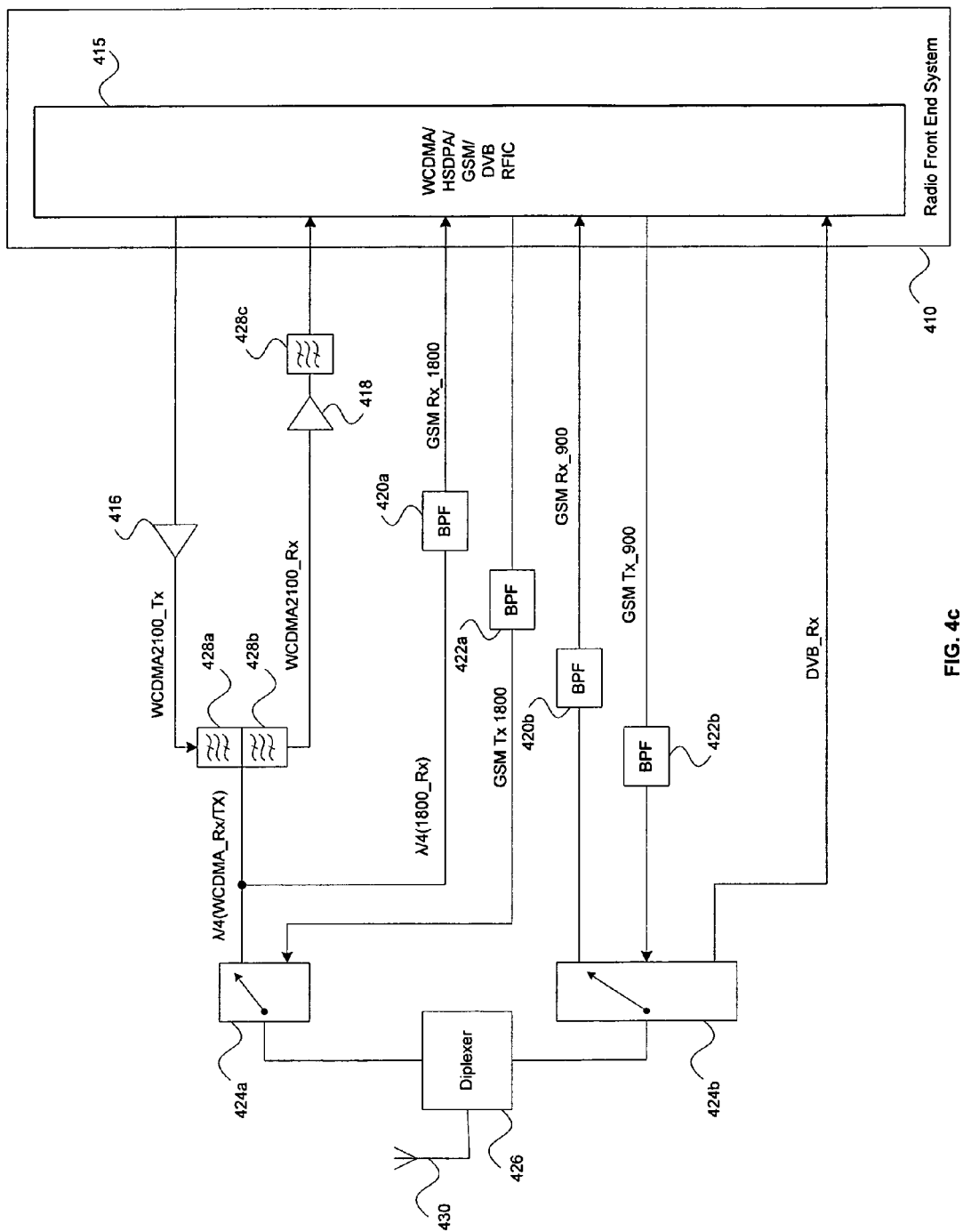
FIG. 4c is a block diagram illustrating an exemplary RFFE comprising a single cellular/broadcast service RFIC coupled to a single antenna.

FIG. 4*c* is a block diagram illustrating an exemplary RFFE comprising a single cellular/broadcast service RFIC coupled to a single antenna. Referring to FIG. 4*c* shows an RFFE 410, a power amplifier 416, a low noise amplifier 418, a plurality of bandpass filters BPF 420*a* and BPF 420*b*, a plurality of bandpass filters BPF 422*a* and BPF 422*b*, a plurality of switches 424*a* and 424*b*, a diplexer 426, a plurality of polyphase filters 428*a*, 428*b* and 428*c* and an antenna 430. The RFFE 410 comprises WCDMA/HSDPA/GSM/DVB RFIC 415. The WCDMA/HSDPA/GSM/DVB RFIC 415 receives and transmits RF signals for the WCDMA cellular service in the 2.1 GHz frequency band. The RFIC 415 further receives and transmits RF signals for the GSM cellular service in the 900 MHz and 1.8 GHz frequency bands. The RFIC 415 also receives RF signals from broadcast services in the VHF/UHF frequency bands.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating with a plurality of communication networks, the method comprising:
    processing in at least one radio frequency front end (RFFE), in a mobile terminal, signals from at least one of a plurality of receive channels, wherein said signals are received via an antenna system comprising a single antenna, a diplexer, a plurality of switches, and a plurality filters, wherein said receive channels comprise at least one VHF/UHF broadcast channel and at least one EU band cellular channel for carrying one or both of voice and data, and wherein said mobile terminal comprises at least a first radio frequency integrated circuit (RFIC) that handles said at least one VHF/UHF broadcast channel, and at least a second RFIC that handles said EU band cellular channel independently of said first RFIC.

2. The method according to claim 1, comprising receiving at said at least one RFFE said EU band cellular channel comprising a WCDMA channel in the 2100 MHz range.

3. The method according to claim 1, comprising receiving at said at least one RFFE said EU band cellular channel comprising a GSM channel in the 1800 MHz range.

4. The method according to claim 1, comprising receiving at said at least one RFFE said EU band cellular channel comprising a GSM channel in the 900 MHz range.

5. The method according to claim 1, comprising transmitting WCDMA signals in the 2100 MHz range via an amplifier and using said at least one RFFE.

6. The method according to claim 1, comprising transmitting GSM signals in the 1800 MHz range using said at least one RFFE.

7. The method according to claim 1, comprising transmitting GSM signals in the 900 MHz range using said at least one RFFE.

8. The method according to claim 1, comprising receiving in said mobile terminal WCDMA 2100 MHz, GSM 900 MHz, and GSM 1800 MHz EU band cellular channels and VHF/UHF broadcasting channels, wherein said mobile terminal comprises a single cellular/broadcast radio frequency integrated circuit (RFIC) that handles said receive WCDMA 2100 MHz, GSM 900 MHz, and GSM 1800 MHz EU band cellular channels and said receive VHF/UHF broadcasting channels.

9. The method according to claim 1, comprising transmitting WCDMA 2100 MHz, GSM 900 MHz, and GSM 1800 MHz EU band cellular channels using a single cellular/broadcast radio frequency integrated circuit (RFIC) in said mobile terminal.

10. The method according to claim 1, comprising receiving in said mobile terminal WCDMA 2100 MHz, GSM 900 MHz, and GSM 1800 MHz EU band cellular channels and VHF/UHF broadcasting channels, wherein said mobile terminal comprises a cellular band radio frequency integrated circuit (RFIC) that handles said receive WCDMA 2100 MHz, GSM 900 MHz, and GSM 1800 MHz EU band cellular channels and a second RFIC that handles said receive VHF/UHF broadcasting channels.

11. The method according to claim 1, comprising transmitting WCDMA 2100 MHz, GSM 900 MHz, and GSM 1800 MHz EU band cellular channels using a cellular band radio frequency integrated circuit (RFIC) in said mobile terminal.

12. The method according to claim 1, comprising receiving in said mobile terminal WCDMA 2100 MHz, GSM 900 MHz, and GSM 1800 MHz EU band cellular channels and VHF/UHF broadcasting channels, wherein said mobile terminal comprises a first radio frequency integrated circuit (RFIC) that handles said receive WCDMA 2100 MHz EU band cellular channel, a second RFIC that handles said receive GSM 900 MHz and GSM 1800 MHz EU band cellular channels, and a third RFIC that handles said receive VHF/UHF broadcasting channels.

13. The method according to claim 1, comprising transmitting WCDMA 2100 MHz EU band cellular channels using a first radio frequency integrated circuit (RFIC) in said mobile terminal and GSM 900 MHz and GSM 1800 MHz EU band cellular channels using a second RFIC in said mobile terminal.

14. A system for communicating with a plurality of communication networks, the system comprising:
    at least one radio frequency front end (RFFE), in a mobile terminal, that processes signals from at least one of a plurality of receive channels, wherein said at least one RFFE receives said signals via an antenna system comprising a single antenna, a diplexer, a plurality of switches, and a plurality of filters, and wherein said receive channels comprise at least one VHF/UHF broadcast channel and at least one EU band cellular channel for carrying one or both of voice and data, and wherein said mobile terminal comprises at least a first radio frequency integrated circuit (RFIC) that handles said at least one VHF/UHF broadcast channel, and at least a second RFIC that handles said EU band cellular channel independently of said first RFIC.

15. The system according to claim 14, wherein said at least one RFFE receives said EU band cellular channel comprising a WCDMA channel in the 2100 MHz range.

16. The system according to claim 14, wherein said at least one RFFE receives said EU band cellular channel comprising a GSM channel in the 1800 MHz range.

17. The system according to claim 14, wherein said at least one RFFE receives said EU band cellular channel comprising a GSM channel in the 900 MHz range.

18. The system according to claim 14, wherein said at least one RFFE and an amplifier are used to transmit WCDMA signals in the 2100 MHz range.

19. The system according to claim 14, wherein said at least one RFFE is used to transmit GSM signals in the 1800 MHz range.

20. The system according to claim 14, wherein said at least one RFFE is used to transmit GSM signals in the 900 MHz range.

21. The system according to claim 14, wherein said mobile terminal receives WCDMA 2100 MHz, GSM 900 MHz, and GSM 1800 MHz EU band cellular channels and VHF/UHF broadcasting channels and said mobile terminal comprises a single cellular/broadcast radio frequency integrated circuit (RFIC) that handles said receive WCDMA 2100 MHz, GSM 900 MHz, and GSM 1800 MHz EU band cellular channels and said receive VHF/UHF broadcasting channels.

22. The system according to claim 14, wherein said mobile terminal transmits WCDMA 2100 MHz, GSM 900 MHz, and GSM 1800 MHz EU band cellular channels using a single cellular/broadcast radio frequency integrated circuit (RFIC).

23. The system according to claim 14, wherein said mobile terminal receives WCDMA 2100 MHz, GSM 900 MHz, and GSM 1800 MHz EU band cellular channels and VHF/UHF broadcasting channels and said mobile terminal comprises a cellular band radio frequency integrated circuit (RFIC) that handles said receive WCDMA 2100 MHz, GSM 900 MHz, and GSM 1800 MHz EU band cellular channels and a second RFIC that handles said receive VHF/UHF broadcasting channels.

24. The system according to claim 14, wherein said mobile terminal transmits WCDMA 2100 MHz, GSM 900 MHz, and GSM 1800 MHz EU band cellular channels using a cellular band radio frequency integrated circuit (RFIC).

25. The system according to claim 14, wherein said mobile terminal receives WCDMA 2100 MHz, GSM 900 MHz, and GSM 1800 MHz EU band cellular channels and VHF/UHF broadcasting channels and said mobile terminal comprises a first radio frequency integrated circuit (RFIC) that handles said receive WCDMA 2100 MHz EU band cellular channel, a second RFIC that handles said receive GSM 900 MHz and GSM 1800 MHz EU band cellular channels, and a third RFIC that handles said receive VHF/UHF broadcasting channels.

26. The system according to claim 14, wherein said mobile terminal transmits WCDMA 2100 MHz EU band cellular channels using a first radio frequency integrated circuit (RFIC) and GSM 900 MHz and GSM 1800 MHz EU band cellular channels using a second RFIC.

* * * * *